United States Patent
Righter et al.

(10) Patent No.: US 9,841,883 B2
(45) Date of Patent: Dec. 12, 2017

(54) USER INTERFACES FOR MEDIA APPLICATION

(71) Applicant: Home Box Office, Inc., New York, NY (US)

(72) Inventors: Jonhenry A. Righter, Mountlake Terrace, WA (US); Tyler R. Furtwangler, Sammamish, WA (US); Brendan Joseph Clark, Seattle, WA (US); Brandon C. Furtwangler, Issaquah, WA (US); Steven N. Furtwangler, Okemos, MI (US); J. Jordan C. Parker, Seattle, WA (US); Nathan J. E. Furtwangler, Kirkland, WA (US)

(73) Assignee: HOME BOX OFFICE, INC., New York, NY (US)

( * ) Notice: Subject to any disclaimer, the term of this patent is extended or adjusted under 35 U.S.C. 154(b) by 99 days.

(21) Appl. No.: 14/843,845

(22) Filed: Sep. 2, 2015

(65) Prior Publication Data
US 2016/0070447 A1    Mar. 10, 2016

Related U.S. Application Data

(60) Provisional application No. 62/046,075, filed on Sep. 4, 2014.

(51) Int. Cl.
*G06F 3/0484* (2013.01)
*G11B 27/10* (2006.01)
(Continued)

(52) U.S. Cl.
CPC ...... *G06F 3/04842* (2013.01); *G06F 3/04847* (2013.01); *G11B 27/105* (2013.01);
(Continued)

(58) Field of Classification Search
CPC .......... H04N 21/4312; H04N 21/4314; H04N 21/47217; H04N 21/4821; H04N 5/44543; G11B 27/105; G11B 27/28; G11B 27/34
See application file for complete search history.

(56) References Cited

U.S. PATENT DOCUMENTS

| 5,204,706 A * | 4/1993 | Saito ................... G11B 27/031 348/E5.067 |
| 6,289,363 B1 * | 9/2001 | Consolatti ......... G06F 17/30014 707/999.104 |

(Continued)

FOREIGN PATENT DOCUMENTS

| EP | 0782085 A1 | 7/1997 |
| EP | 1669998 A1 | 6/2006 |
| WO | 2007102862 A1 | 9/2007 |

OTHER PUBLICATIONS

International Search Report and Written opinion from International Patent Application Serial No. PCT/US15/48407, dated Feb. 8, 2016, 16 pages.

(Continued)

*Primary Examiner* — Huy T Nguyen
(74) *Attorney, Agent, or Firm* — Amin, Turocy & Watson, LLP

(57) ABSTRACT

The described technology is directed towards user interface technology that guides users in making content (e.g., video selection) and also navigating within selected content. A selection menu view uses style changes to indicate focus changes, e.g., including animating opacity values to indicate a focused item view versus those items not in focus. In another view, a subset of filmstrip views are displayed, each representing a chapter location in a video, along with a flipbook view that represents a selected scene within a selected chapter. Interaction with the filmstrip views (Continued)

changes the visible subset. Interaction with the flipbook view changes the selected scene; a play command plays the video based upon the selected scene.

20 Claims, 12 Drawing Sheets

(51) Int. Cl.
  G11B 27/28      (2006.01)
  G11B 27/34      (2006.01)
  H04N 5/445      (2011.01)
  H04N 21/431     (2011.01)
  H04N 21/472     (2011.01)
  H04N 21/482     (2011.01)
(52) U.S. Cl.
  CPC .............. *G11B 27/28* (2013.01); *G11B 27/34* (2013.01); *H04N 5/44543* (2013.01); *H04N 21/4312* (2013.01); *H04N 21/4314* (2013.01); *H04N 21/47217* (2013.01); *H04N 21/4821* (2013.01)

(56) References Cited

U.S. PATENT DOCUMENTS

| | | | |
|---|---|---|---|
| 8,495,514 B1* | 7/2013 | Ludolph | ............... G06F 3/0481 715/768 |
| 2011/0161818 A1* | 6/2011 | Viljamaa | ................ G11B 27/28 715/720 |
| 2011/0197131 A1 | 8/2011 | Duffin et al. | |

OTHER PUBLICATIONS

Mills M; et al: "A Magnifier Tool for Video Data," Proceedings of the Conference on Human Factors in Computing System, publication date May 5, 1992, 6 pages.

Hongjiang Zhang, et al: "Content-Based Video Browsing Tools," Proceedings of SPIE—International Society for Optical Engineering, dated Feb. 6, 1995, vol. 2417, 10 pages.

\* cited by examiner

USER INTERFACES FOR MEDIA APPLICATION

CROSS-REFERENCE TO RELATED APPLICATION

The present application claims priority to U.S. provisional patent application Ser. No. 62/046,075, filed Sep. 4, 2014, the entirety of which is incorporated herein by reference.

BACKGROUND

A user interface (UI) of a computer program, to be considered favorably by end users, needs to be straightforward to use and consistent in its operation. One of the ways to make a UI straightforward to use is by using various mechanisms to guide the user in knowing where he or she is operating with respect to the UI.

In a media player application such as one that plays streaming video, a user often interacts with a user interface to select a video (e.g., a movie or television show) for playback. This can be confusing when there are hundreds or thousands of titles from which to select, as a user can easily get lost within the subset of titles being displayed at any one time for interaction. Thereafter, once a movie or television show is selected, the user often has difficulty finding a desired location within the video (such as when a user stops the media player application and later wants to resume from the stopping point, or wants to skip over some content or go back and replay some content).

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, the technology described herein is directed towards outputting to a user interface, including providing a subset of filmstrip views each representing a chapter location in a video, and a flipbook view that represents a selected scene within a selected chapter. Interaction with the filmstrip views changes the visible subset, while interaction with the flipbook view changes the selected scene. A play command causes playing of the video based upon the selected scene represented in the flipbook view. Also described is a selection menu view that uses style changes to indicate focus changes, e.g., including animating opacity values to indicate a focused item view versus those item views not in focus.

Other advantages may become apparent from the following detailed description when taken in conjunction with the drawings.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
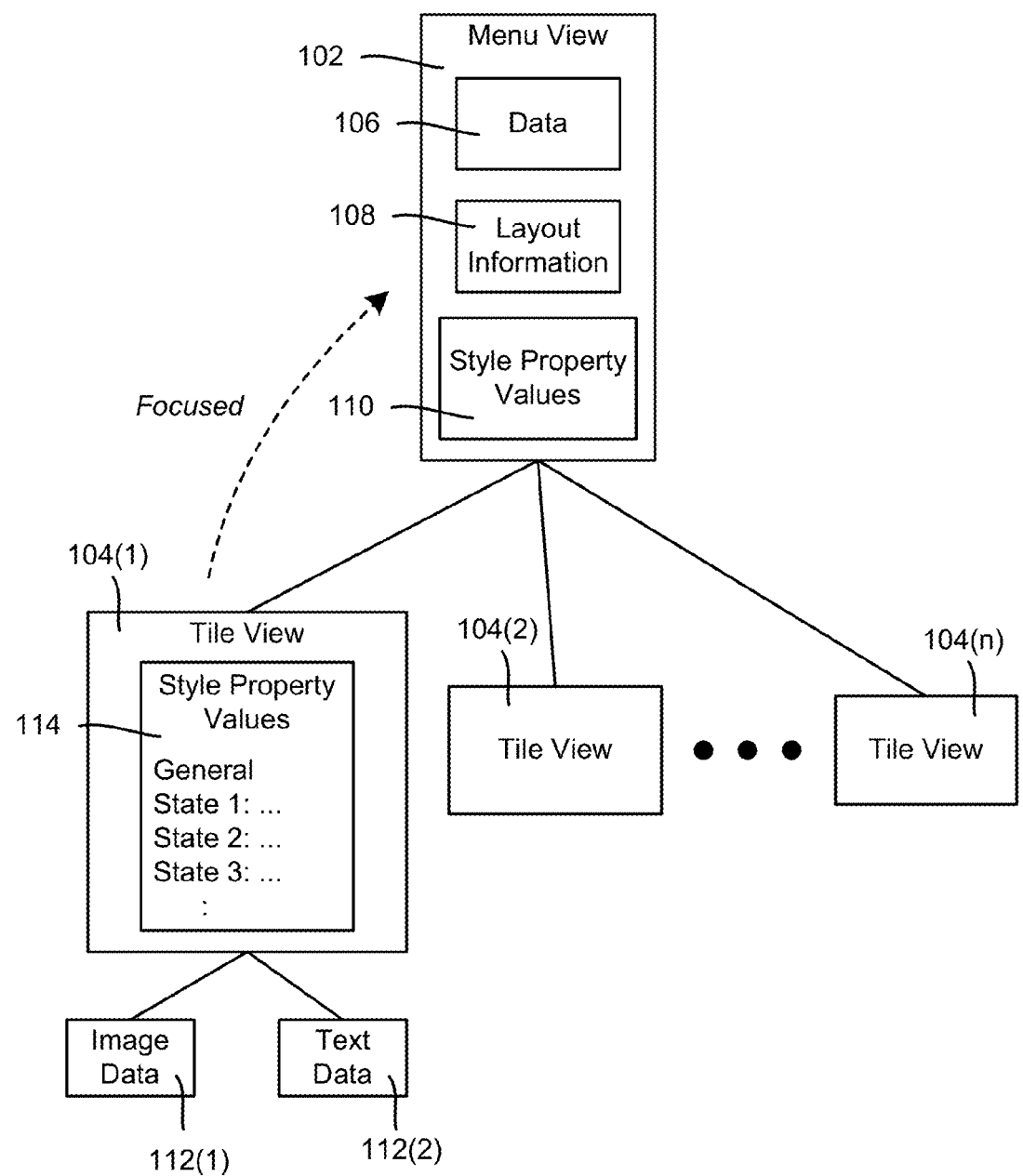
FIG. 1 is block diagram showing various example components for implementing styled views, including the views represented in FIGS. 2-4, 5A-5C, or 6A and 6B, according to one or more example implementations.

Various aspects of the technology described herein are generally directed towards a user interface (UI) technology that provides for straightforward interaction that assists users in selecting streaming content (e.g., a movie or television show), as well as for navigating to a desired location within a video. For purposes of brevity, the term "video" will be used herein to mean "streaming content" whether that content includes audio or not, has superimposed text or not, and so on. Further, it is understood that "video" as used herein may be exemplified with respect to certain types of content, but is intended to cover any type of such content; (non-limiting examples include movies, trailers, outtakes, television shows, user-created internet videos, commercials and so on).

In one or more aspects, a user is provided with various menus from which to select a video. One or more menus may present videos for selection in the form of a grid of tiles, in which the tiles need not be the same size or shape (although rectangles and squares are most common). The tiles may include text and/or an image, and the grid may use styling on the tiles, e.g., to highlight or otherwise emphasize a particular tile (or set of tiles), such as the tile that has "focus" with respect to selection of that tile (via further interaction) from among those currently presented. Styling may include visible properties such as background color, borders, opacity, and so on. Styles may be animated by varying styling data over a number of rendering frames.

In one or more aspects, after selection of a video, while interacting with that video to find a location, a "filmstrip" may be presented that comprises a horizontal mosaic of screenshot images representing "chapter" locations, or stops. These chapter locations may be predetermined increments of time (not necessarily tied into an actual chapter), or correspond to actual encoded chapters.

A "flipbook" comprises a single frame of video, e.g., centered atop a filmstrip, that shows the location at which the user is currently positioned within the timeline of a video. In one or more implementations, the flipbook is displayed in an area that is a centered, slightly enlarged and highlighted frame relative to the filmstrip screenshot images. Via flipbook interaction, a user may navigate among the frames or some set of multiple frames, (e.g., in one second increments a set is thirty frames at thirty frames per second). The time increments between flipbook images are much shorter than those of the filmstrip chapter increments and display to the user the frame or approximate frame at which the user will start at if he or she chooses "Play" via a suitable input device.

In one or more implementations, the filmstrip chapter stops that are prior to the user's currently selected location (as shown in the flipbook) are located to the left of the currently selected location, and the chapter stops that follow are located to the right. A user may scroll forward and back among these filmstrip chapter stops, as well as choose to play the flipbook, from the scene currently represented therein.

It should be understood that any of the examples herein are non-limiting. For instance, transitions related to changing the opacity of a UI element via animation over multiple rendering frames are exemplified herein, however animations are not related solely to opacity, but include concepts such as movement, changing size, changing color, changing orientation, and so on. Further, anything that is shown as being horizontally arranged may instead by vertically arranged, and vice-versa.

It is also understood that any of the logic and the like may be implemented in software, hardware or a combination thereof. Moreover, an entertainment/game console is one example of a suitable computing environment for the technology described herein, however any other suitable computer-based device such as a personal computer, tablet device, mobile computer device, smartphone, handheld device and the like may implement the technology described herein.

As such, the technology described herein is not limited to any particular embodiments, aspects, concepts, structures, functionalities or examples described herein. Rather, any of the embodiments, aspects, concepts, structures, functionalities or examples described herein are non-limiting, and the technology may be used in various ways that provide benefits and advantages in computing and user interface concepts in general.

FIG. 1 is a block diagram showing example components that may be used to produce a user interface (UI) for presenting to a user in one or more implementations. In general, a view is an object that provides data that is processed for rendering to an output device. For example, a menu view 102 is a view that outputs for display a menu of UI items (also view objects) for selection. These UI items are child views of the menu view, and for example may be selection buttons when considered in a conventional sense, e.g., an interactive HTML button. Instead, however, child views may be tiles, which like buttons may be interactive for selection but also allow for images, text, video and so on to be combined (e.g., as children of a tile) in the tile for presenting a styled representation of the tile to a user. Note that the set of views forms a view tree, at least some of which corresponds to visible output.

In FIG. 1, the menu view 102 has a number of tiles 104(1)-104(n) as its children, which are identified in data 106 of the menu view 102 (or data associated with the menu view). The menu view 102 also has (or is coupled to) layout information 108 that for example may describe where its children are to be located relative to each other and relative to the representation of the menu, the dimensions of the children (e.g., possibly before scaling for device size), and so on. Style property values 110 are also maintained in (or coupled to) the menu view 102, e.g., what background color to display, the size and color of a menu border (if any) and so on.

The menu view 102 may only visualize a subset of its children at any one time, e.g., those currently scrolled into view. This saves resources, as for example a menu may not need to have all its child views instantiated at once (there may be thousands), only those currently visible and possibly a few others that are buffered as likely to be visible soon.

Each view draws itself, and then has its specified children draw over the parent view according to the layout information of the parent. In general, the view uses its style data in drawing itself, (although a parent may override any of a child's style data with style data from the parent, so that its children animate into the parent view in the same way, for example).

In the example of FIG. 1, the tile view 104(1) has a child view 112(1) comprising text data (such as a title, rating and video identifier ID)) and another child view 112(2) comprising image data; (other tiles similarly have such children, however these are omitted in FIG. 1 for purposes of clarity). Having the tile have children instead of fixed data allows for changing what the tile represents simply by changing the data; for example, a tile for selecting a "most popular" video can remain the same but will appear differently over time by changing the text and image data for what is most popular at the time.

The set of style data for a view may include subsets that are chosen based upon a current interactive state. This is exemplified in FIG. 1 by the style view property values 114, in which there is a set of general style property values and property values that may override (at least some) of the general style property values for different states.

For example, a view when in a "focused" state may have a subset of style data that specifies a different background color, border, size, font, font color, font size, and/or the like relative to the subset of style data that is applied when not focused. Other interactive states that may result in different style property data subset selection include (but are not limited to) hovered, pressed, selected and listening (e.g., for speech or gesture input). Other states include entering (e.g., coming into view) and exiting (e.g., leaving view). Moreover, a style change may be animated over a number of frames; e.g., to initially draw a view at fifty percent opacity, and then over five seconds gradually increase the opacity to one hundred percent.

Any interaction information such as interaction that focuses a child may be passed up to the child's parent and to that parent's parent and so on to a top level, e.g., up the focus chain. A parent likewise may communicate information to its affected children. For example, a right arrow/cursor keyboard key received at a focused child may be processed by the UI to change focus from that child to another; however, only the child that had focus knows of the keyboard press. Thus, the child that had focus tells its parent of the interaction that occurred, namely that the right arrow/cursor keyboard key was pressed, whereby the parent determines which child is to be the newly focused child, and tells the child that had focus that it no longer does and tells the newly focused child of its now-focused state (so each can redraw accordingly).

Figure 2:
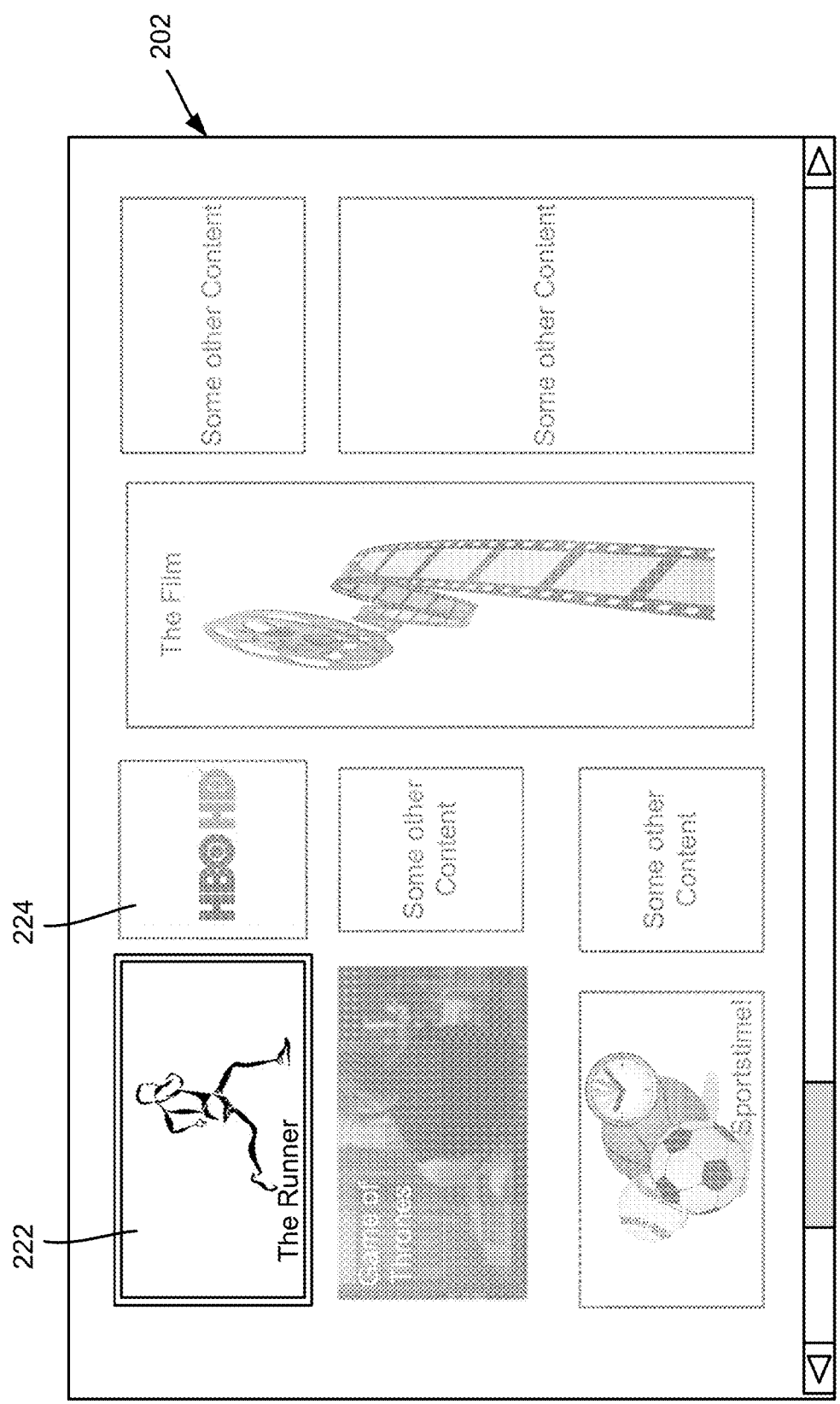
FIGS. 2-4 comprise representations of an example menu view with child tile views, including animating a change of focus between child views, according to one or more example implementations.
Figure 3:
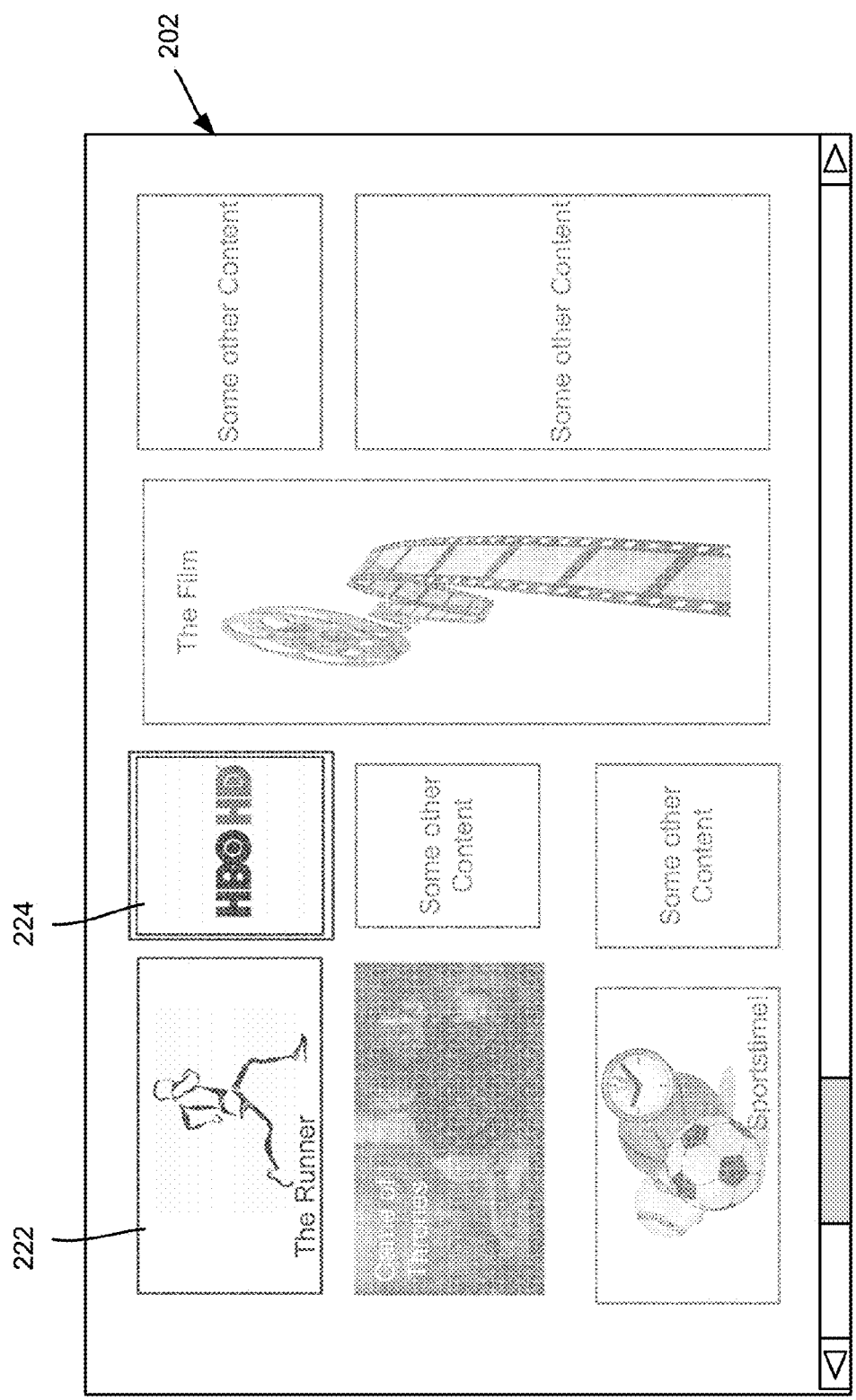
Figure 4:
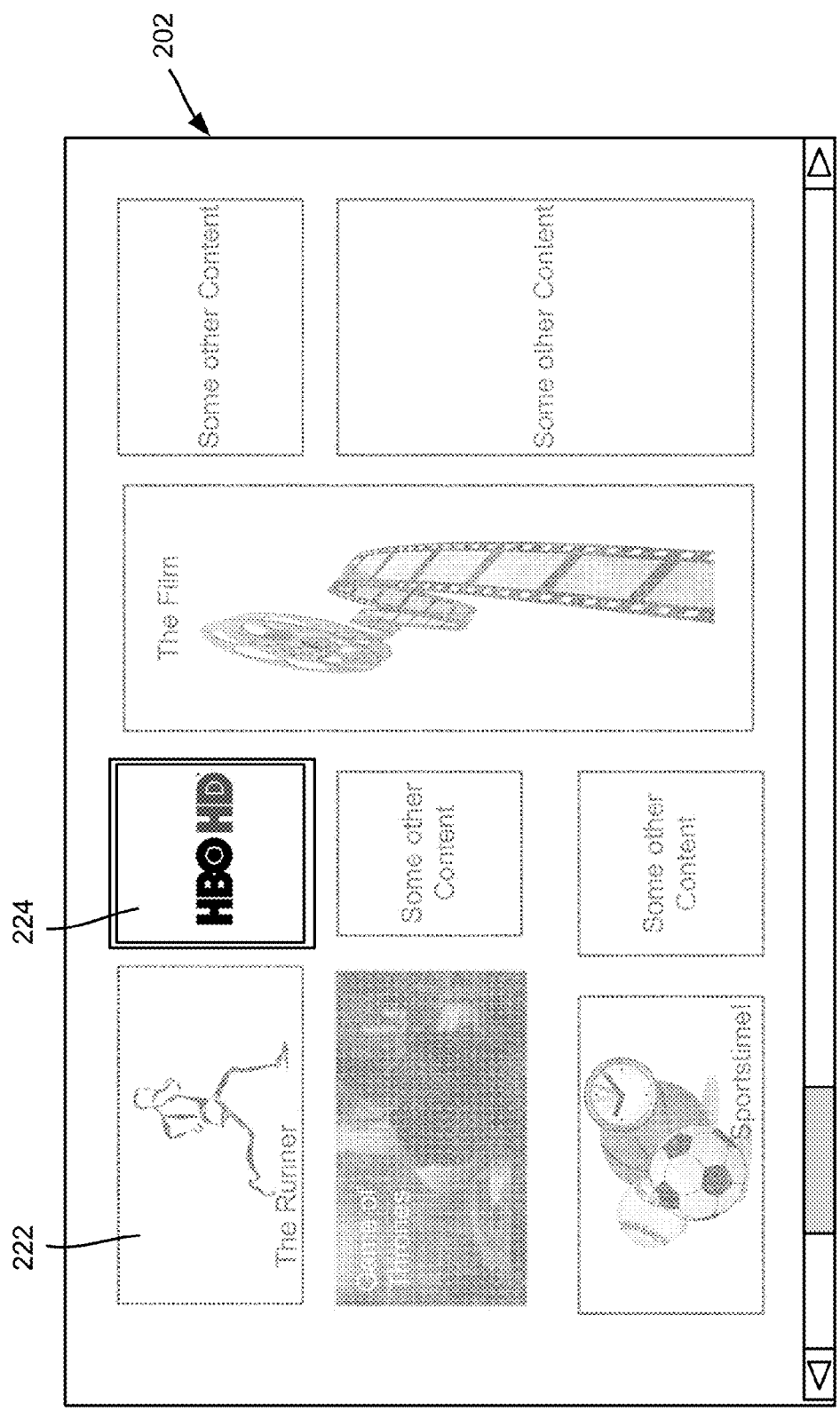

FIGS. 2-4 show how a menu 202 in the form of a grid of tiles may facilitate video selection, which may be accomplished via style animation. FIG. 2 is an initial frame, FIG. 3 is an interim frame, and FIG. 4 is the last frame (e.g., until further interaction occurs). In this example, varying degrees of opacity are used to emphasize one or more elements that are in focus by a user, and thus are able to be selected. In one example, by default, selectable elements are displayed at a reduced opacity (e.g., from sixty percent to eight percent). When the user places focus on an item, the item will gradually—but relatively rapidly—increase to one-hundred opacity, which for most viewers creates a subtle illusion that the item has illuminated.

FIG. 2 indicates, among a grid of tiles, that a tile 222 representing some video named "The Runner" is currently in focus, by having opacity of one-hundred percent, (as well as a having a border in this example). The user then shifts focus (e.g., by mouse, touch, keyboard, controller button, voice, gesture or the like) to a tile 224 representing an "HBO HD" channel or the like. This channel may, if selected, stream video content that is currently being played on that channel on conventional cable or satellite television stations for example, or alternatively the selection of the tile 224 may navigate to a submenu containing available HBO HD video tiles. In any event, in one or more implementations, this focus change triggers a view style change, including an animation transition.

In FIG. 3, the opacity of the tile 222 has decreased, while the opacity of the tile 224 increased (the border also is moved). In FIG. 4, focus finishes shifting from the tile 222 (the opacity of this element 222 is decreased to match the other non-focused tiles) to the tile 224 (the opacity of this element 224 is increased to one-hundred percent).

In this way, a focus change is made readily apparent to the user, with the animation providing an appealing visual effect. Note that other ways to highlight an element are feasible, such as flashing, enlarging, changing color, drawing behind the element and so on.

Figure 5A:
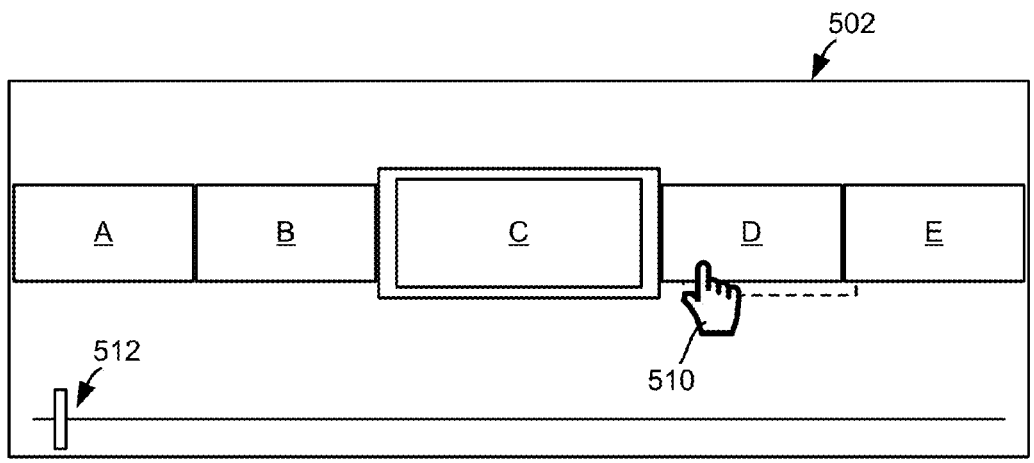
FIGS. 5A-5C are example representations showing interaction to change filmstrip views and a flipbook view to guide a user in selecting a scene, according to one or more example implementations.

Turning to aspects related to navigation within a selected video, FIG. 5A shows a view 502 demonstrating the concept of a filmstrip of chapter locations (that is, stops) comprising image tiles (A, B, D and E), upon which a flipbook UI tile (element C) is centered. Although not explicitly represented in FIGS. 5A-5C, the view 502 likely shows a relevant "full-view" image as its background as described herein. This may be a representative view of the entire video, a representative view of the currently selected chapter, or a representative view of the currently selected flipbook scene within the currently selected chapter, for example.

Note that such a view 502 may be automatically entered when a user performs such actions as choosing fast forward or rewind indicating that he or she is interested in navigating to a new location within the video. Alternatively, or in addition to automatic entering, such a view 502 may be manually entered by a user navigating to the "filmstrip" view via a menu selection or the like. For example, instead of playing a movie video if the user selects a tile representing the movie video (e.g., with title and representative image such as a well-recognized frame in the movie or the movie poster), the user may be given an interaction screen that offers "Play," a plot summary (or menu item for displaying this), cast and characters (or menu item for displaying this), and so on, along with a "Move to Scene" menu item or the like that navigates to the filmstrip view 502.

Figure 5B:
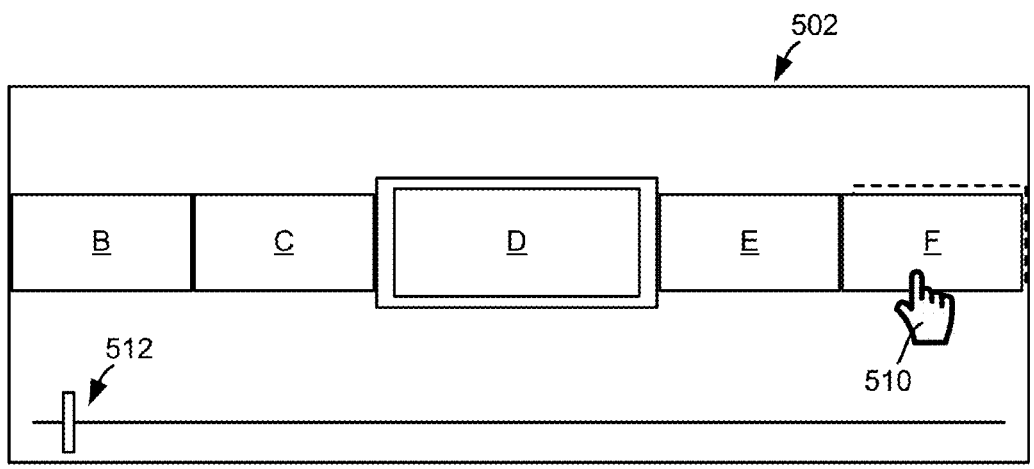
Figure 5C:
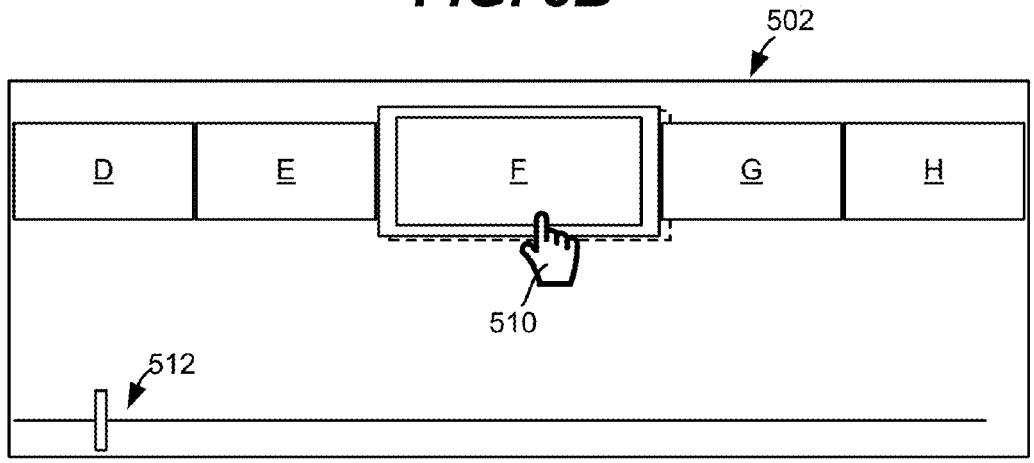

In general, a user typically interacts with the view tiles via mechanical buttons (e.g., game controller buttons, keyboard keys, a remote control device), by touch or pointer directly on the tiles, or by voice or gesture. In the example of FIGS. 5A-5C, the user is using a pointing device, as represented by the "hand" like pointer cursor 510.

In FIG. 5A, the user has selected the tile D via the pointer cursor 510 and mouse click or the like (or via another input mechanism), as represented by the dashed box below it; e.g., such a button may animate by appearing to be pressed down when entering and leaving the selected state. This results in the state represented in FIG. 5B, namely that the filmstrip chapter stops have moved left so that now the tiles B, C, E and F visible, with tile D corresponding to the tile in the flipbook location.

Also shown in FIG. 5B, the user has selected via the pointer cursor 510 mouse click or the like to select the tile F (as indicated by the dashed box below the tile indicating some animated movement). The result is represented in FIG. 5C, where the selected tile F becomes the centered tile corresponding to the flipbook position, with filmstrip chapter stops D, E, G and H being presented. As can be seen, the user may move around chapter stops to find a desired location within a video.

Note further that a timeline (with position indicator) 512 (or other scrolling type mechanism or the like) may be used to help a user understand the general location within a video. The timeline 512 also may be interactive to help expedite finding a desired chapter stop/flipbook location. Still further, it is feasible for a user to "page" through the chapters, e.g., changing the visible subset of chapter views in multiples at a time with a single button command, for example.

At some point the user may elect to interact with the flipbook tile, such as the tile F in FIG. 5C. In this example, the user may select it in various ways such as by button, mouse or touch, or in this example, by selecting via the pointer cursor 510 with a mouse click or the like.

Figure 6A:
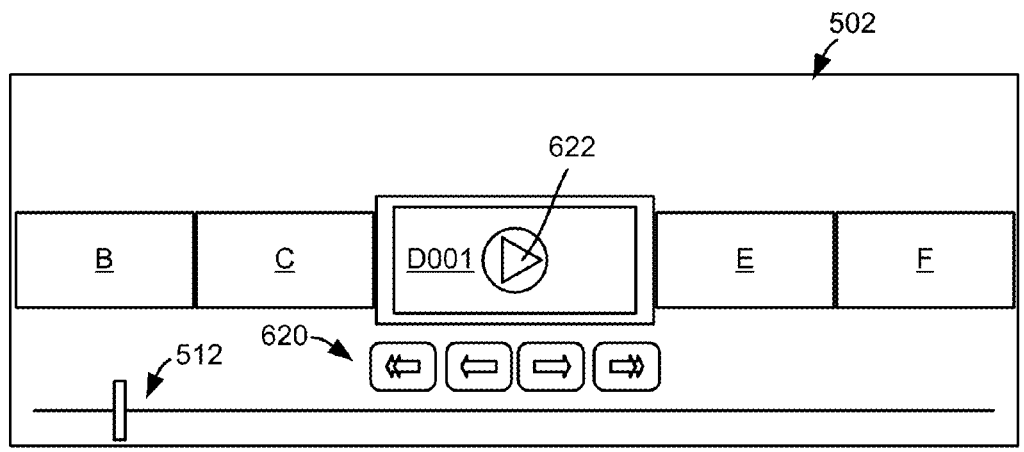
FIGS. 6A and 6B are example representations showing interaction with a flipbook view to change a current scene or play based upon a current scene, according to one or more example implementations.
Figure 6B:
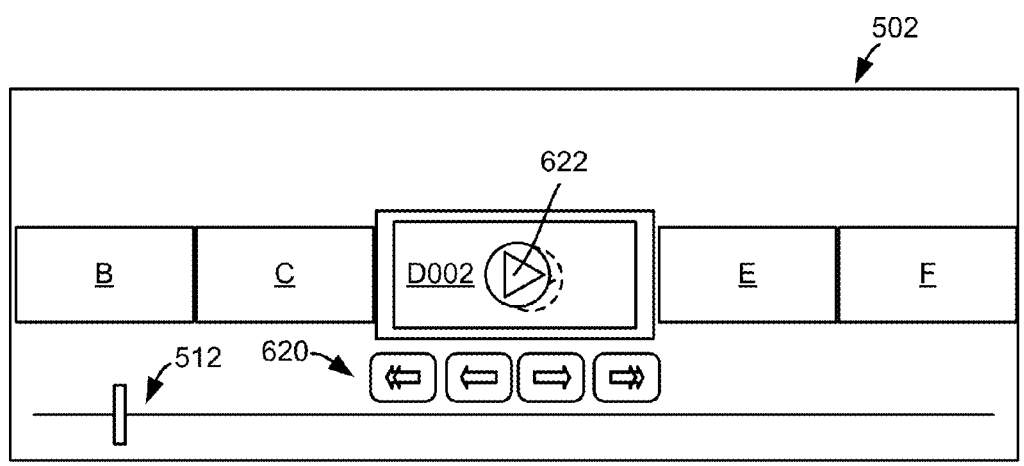

When this occurs, the user is able to interact with the flipbook to navigate to different scenes therein. The scenes may be displayed as frames in the tile, e.g., scene D001 (chapter D, scene 001) is shown in FIG. 6A. Buttons 620 or the like may be presented to allow forward and backward movement, e.g., in small increments or large increments in this example, e.g., to move to scene D002 in FIG. 6B. Note that in one more implementations, the menu 502 also may change its background scene to reflect the currently selected scene.

As set forth above, the scenes may be in any suitable increment, whether individual frames, or groups of frames, such as corresponding to a time interval. As also mentioned above, when a time interval is used, it is possible that a scene will provide no value to the user, e.g., an entirely black image may occur. Thus, the scenes may be preselected by an editor or the like to generally approximate a time, yet be adjusted to substitute a nearby image if deemed more valuable. Trickplay is one way to provide such content, in which pre-selected representative images are used; these may be downloaded from a separate source such as then internet as needed.

In general, to find a location within video, a user may scroll forward and back, as well as choose to play the centered, slightly enlarged and highlighted frame C, e.g., a flipbook, by choosing to interact with the flipbook. Note that motion may be used in navigation/selection, e.g., as a user scrolls right (e.g., via a timeline 512) the images move left to be in the center, and vice-versa. The main image in the background may or may not be updated with the centered image.

At some point the user wants to end interaction with the flipbook, either to play based upon the current scene, or further interact with the filmstrip to select a different chapter. To play, a play button 622 or the like may be provided by which the user may play from the scene represented in the tile D. A play command may likewise be issued via a hardware button, or via a user via speech or gesture command, and so on. Note that the currently presented flipbook scene may not exactly be the starting scene for playing the video, but rather the starting scene for playback may be based upon the currently presented flipbook scene. As one example, if the user is navigating one scene at a time and chooses to play, the playback start may be based upon the exact currently presented flipbook scene; however, if a user is fast forwarding rapidly through scenes and chooses to play, the system may "back up" some interval from the currently presented flipbook to attempt to compensate for the user's reflex time and start from where the user likely saw a desired starting point when choosing play.

Figure 7:
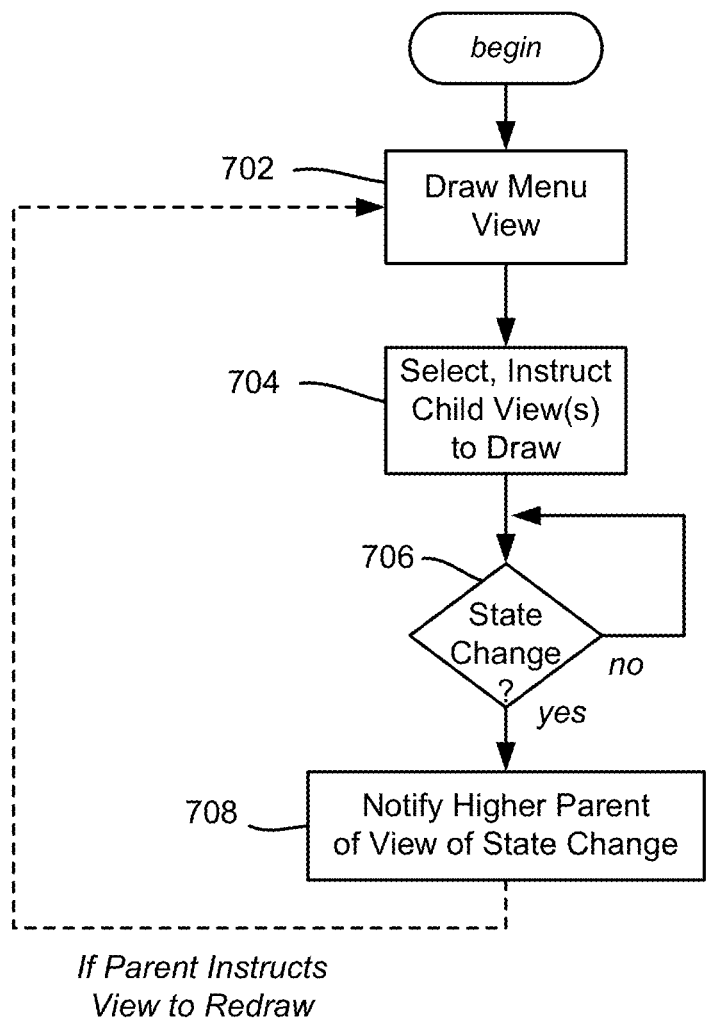
FIG. 7 is a flow diagram showing example steps related to drawing views and redrawing based upon user interaction, according to one or more example implementations.

By way of summary, FIG. 7 is a flow diagram showing example steps generally directed towards changing the appearance of one or more views based upon a state change. Step 702 represents some parent view drawing, e.g., a menu view in FIG. 7, which in this example has children (a parent may have a single child, but for purposes of this example, consider that the menu view has more than one child). The menu view determines which of its children are to draw, selects those, and instructs them to draw at step 704. Each child does so, basically performing the steps of FIG. 7 and so on (until all visible children have drawn and none remain in the view tree). Note that a child may draw itself based upon a current state, e.g., one of the children may have focus.

Step 706 awaits some state change, which as described above may be to exit the menu view (the user has selected something that causes the view and its children to exit), or may be an interaction state change, such as a focus change. For an interaction state change, at least one view knows of the interaction; for button-type input, this is the focused view; for pointer-type input, this is the button below the pointer (determined via hit testing); for command type input, this is one or more visible views. In any event, the parent is informed of any state change, and via step 708 the parent bubbles this information up to its parent, and so on. The parent then waits for further instructions from its parent.

For example, if the state change changes focus to another child view in the same parent view, the parent view and its children redraw, with one of the children instructed that it is no longer in the focused state, and another instructed that it is in the focused state. This allows the children to draw accordingly, including using any "focus change" animation as described above with reference to FIGS. 2-4. In addition to focus change animation, animation for a "pressed" or "selected" (e.g., press and release) state change may be used, such as the button movement animation or the like as described above with reference to FIGS. 5A-5C may be used, for example.

Figure 8:
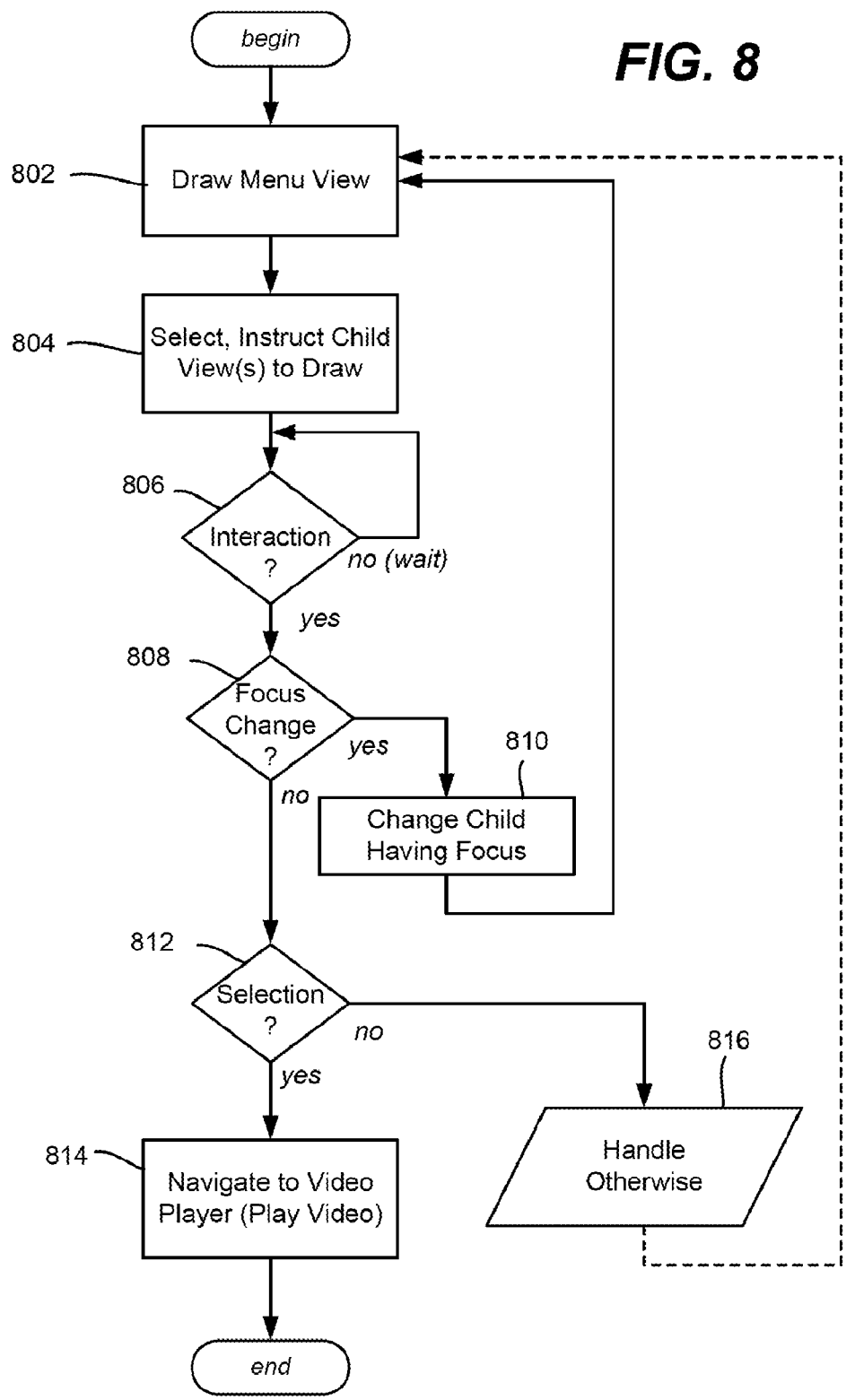
FIG. 8 is a flow diagram showing example steps related to handling interaction directed towards view item focus changes or view item selections, according to one or more example implementations

FIG. 8 shows example flow diagram steps related to selecting a focused tile and/or changing focus to a different tile in a menu view. Other state changes are not considered in detail, however it is understood that these may result in redrawing a view and its children and so on.

Step 802 of FIG. 8 represents a menu view drawing, and step 804 represents the menu view determining which of its children to visualize and instructing those children to draw. Step 806 waits for interaction.

For a focus change (to a child view of the menu view, not to a child of a different view) as evaluated at step 808, step 810 changes the child having focus, resulting in the parent view and its visualized children being redrawn, to reflect the focus change.

If the interaction was a selection as evaluated at step 812, step 814 navigates to a video player, e.g. to play the selected video. It is also feasible that the video player may have an intermediate view rendered, e.g., to display a plot summary, cast and characters and so on, from which play (or Back or Home) may be selected. If not a focus change or play, then the interaction is handled otherwise, e.g., is a state change such as a hover that is not a focus change or selection, is directed to a navigation to a different menu, and so on.

Figure 9:
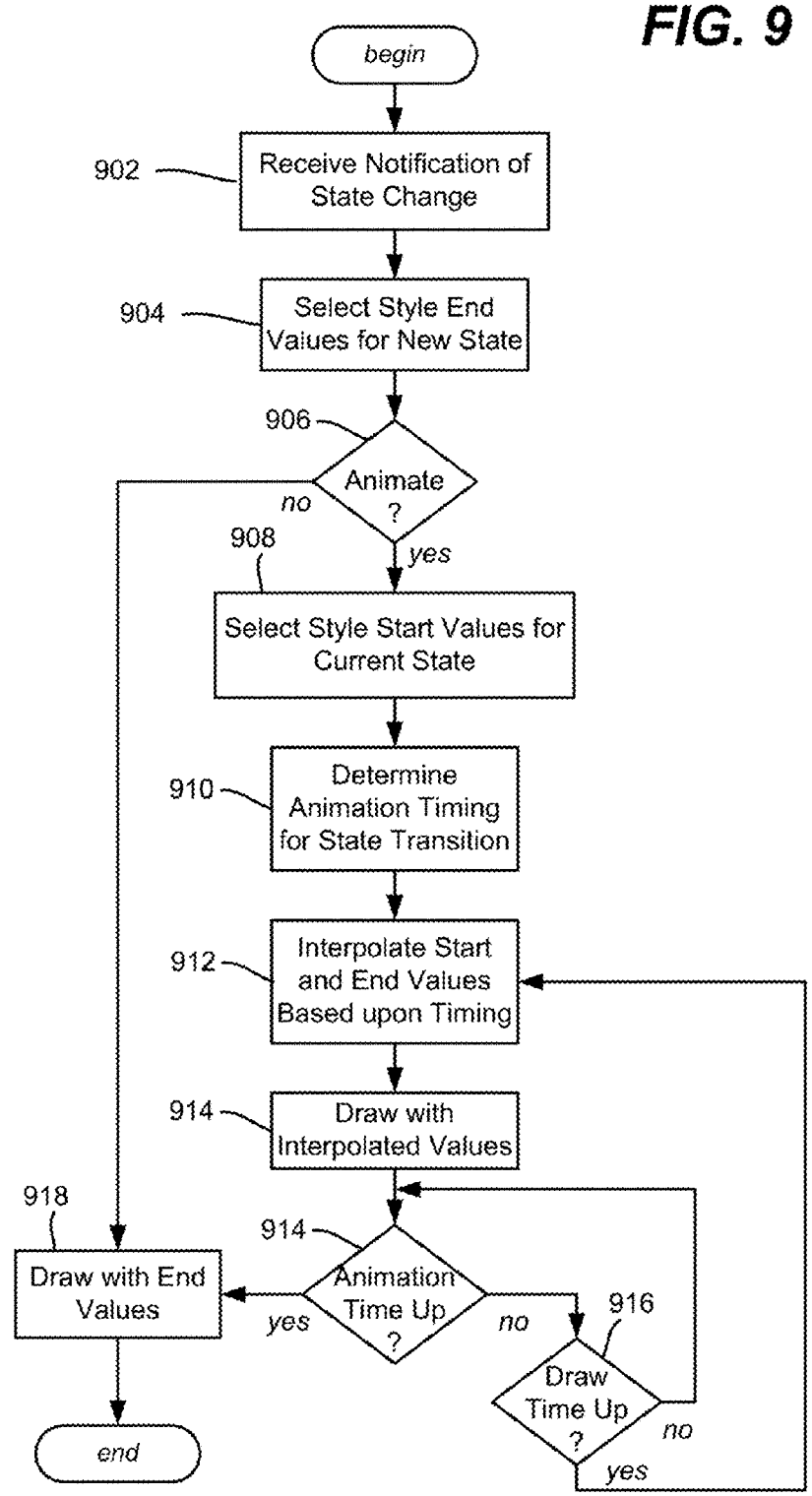
FIG. 9 is a flow diagram showing example steps related to handling a state change, including to output style changes via animation, according to one or more example implementations.

FIG. 9 is a flow diagram having example steps related to changing a view upon notification of a state change (step 902). Step 904 selects the end style property data for the state change, that is, how the view is ultimately to appear. If not animated as evaluated at step 906, then the view branches to step 918 where it draws with the end style values.

However, if animated, then the view transitions from its start style property values (step 908) for the new state. Note that these style property values are ordinarily the property values that the view already has for its soon-to-be former state, however it is feasible to start a transition with different property values.

In any event, step 910 determines the animation timing data for the state transition, which may be a number of frames or a fixed time value, and thus may include adjusting the frame count or a style-specified time value (e.g., two seconds) for different frame rates.

Step 912 interpolates the starting values with ending values based upon the current timing/frames. Step 914 draws with the interpolated values. The process repeats via steps 914 and 916 until the animation time is up, which, for example, can gradually increase opacity for one view while decreasing opacity for another view as in FIGS. 2-4. The end values may be drawn at step 918 when time is up to account for any interpolation rounding errors. Note that step 916 is provided in this example so as to not redraw faster than the frame rate; in actuality, step 916 may be event driven rather than a loop; e.g., the view receives an event or parent instruction to draw, rather than actually looping.

In this way, a view may animate its opacity (as in FIGS. 2-4), animate a position change (as in FIGS. 5A-5C to indicate a tile being selected), animate a color change and so on.

Figure 10:
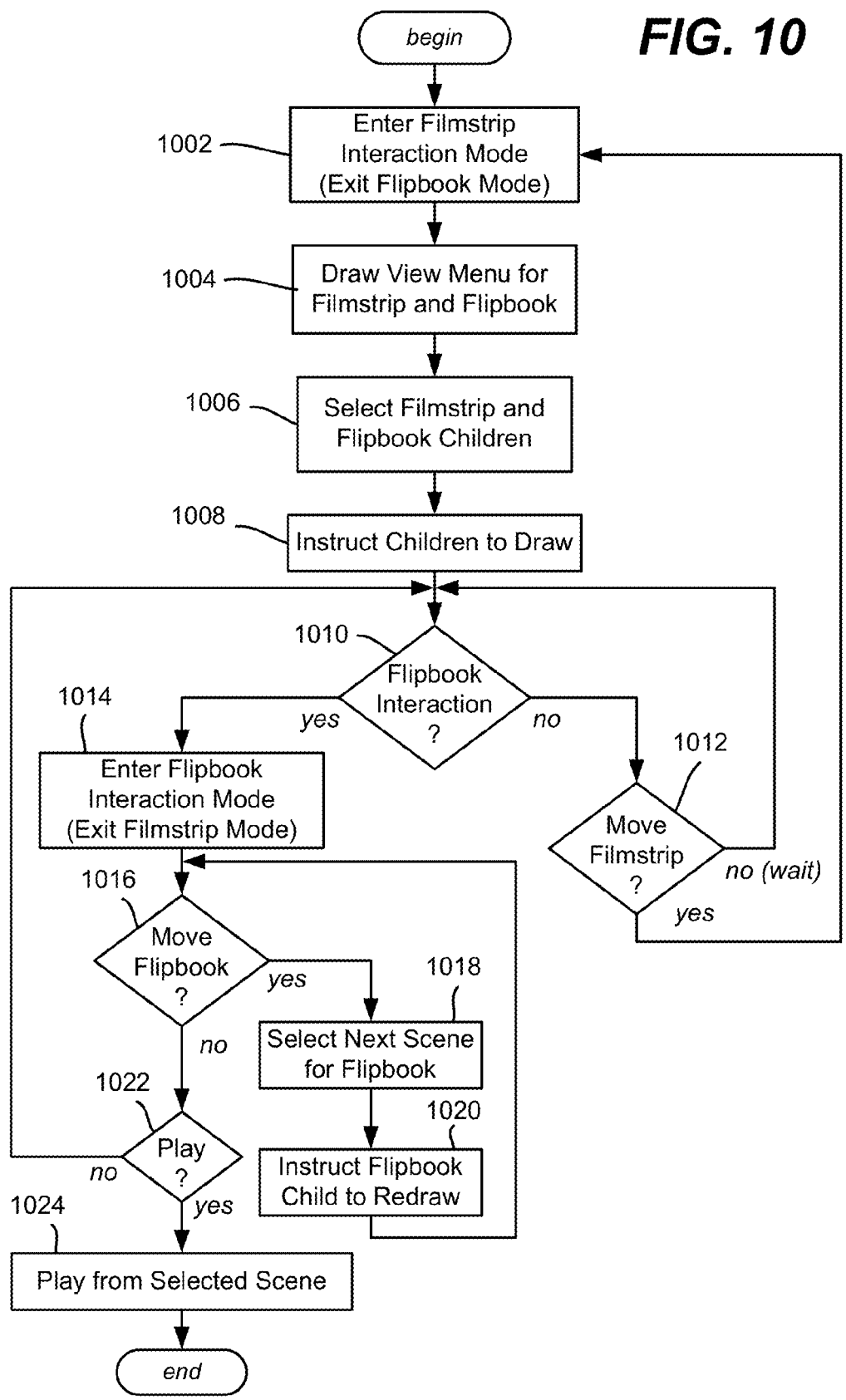
FIG. 10 is a flow diagram showing example steps related to handling interaction with filmstrip views and flipbook view, according to one or more example implementations.

FIG. 10 is a flow diagram showing example steps related to the filmstrip and flipbook interaction, beginning at step 1002 where the menu view's process logically enters a filmstrip interaction mode; (this is in contrast to the flipbook interaction mode in which the user navigates scenes with smaller time/frame increments as described above, e.g., triggered by some interaction with the flipbook tile). Step 1004 draws the view menu, and step 1006 selects the current subset of filmstrip children, the center of which is the flipbook child in one or more implementations. Note that the children may "wraparound" when a user scrolls the timeline to the end, or alternatively, an invisible child may be rendered to indicate that the user cannot move before the first chapter or beyond the last chapter. Step 1008 instructs the selected children to draw.

In the example of FIG. 10, consider that the user can either interact with the filmstrip to select a new chapter for the flipbook, interact with the flipbook to navigate among scenes, or select play. As is understood, there are likely other possible interactions, e.g., a user can select a Back button or Home button to navigate out of the filmstrip/flipbook menu, but these alternatives are easily handled and not shown in FIG. 10 for purposes of brevity.

Step 1010 determines if there is flipbook interaction. If not, the process evaluates at step 1012 whether there is interaction that moves the filmstrip, e.g., a button other than "Play", an interaction with the timeline, a selection of a chapter via a pointer, and so on. If not, the process waits. If so, the process adjusts, leaving the flipbook mode if in that mode, redrawing the view (optionally if nothing has changed) and the new subset of filmstrip children and the flipbook child.

If flipbook interaction is detected, then step 1010 branches to step 1012 to enter the flipbook mode/exit the filmstrip mode (if not already in the flipbook mode). Step 1016 evaluates whether the interaction was to move the flipbook, e.g., navigate to a different scene. If so, step 1018 selects the next scene (different buttons may navigate in different directions and different amounts, for example), after which step 1020 draws the selected scene. Note that if the last scene in either direction, one alternative is to move into the next chapter in that direction if there is a next chapter available (e.g., the next chapter, first scene if moving forward or the previous chapter, last scene if moving back). Another alternative is to stay at the current frame, and, for example, output audio or the like to inform the user that the end of the chapter has been reached.

If the flipbook interaction detected at step 1010 was not to move the flipbook, then one possibility is that the interaction was to play. Note that "Play" can be directly selected even when not in the flipbook mode, such as by hitting a "Play" button or speaking a "Play" command, for example. If play is selected (step 1022), then step 1024 starts playing from the selected scene.

In this simplified example, the other possibility is that the user interacted with the flipbook tile to enter the flipbook mode, but has not yet moved the flipbook scene. Step 1022 waits for the next interaction, which may be a filmstrip interaction (step 1012) a flipbook movement interaction (step 1016) or a flipbook "Play" interaction (step 1022). The process continues to allow navigation to new locations in the video until the user decides to "Play" (or exits as described above but not explicitly shown in FIG. 10).

Figure 11:
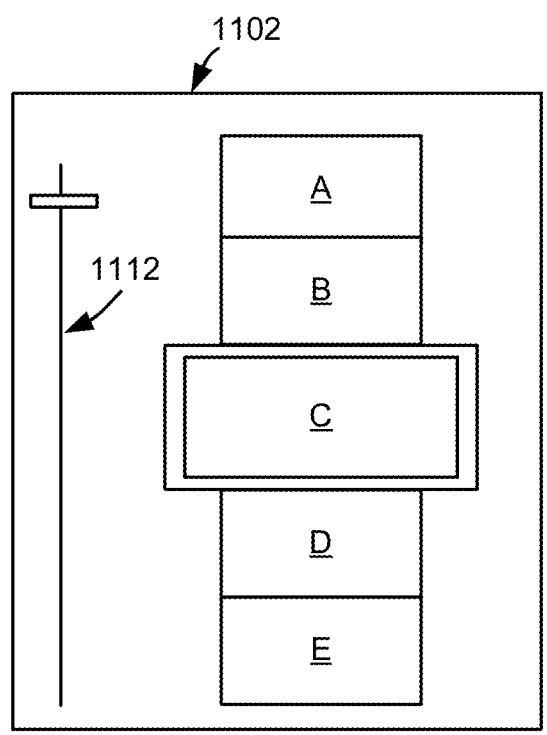
FIG. 11 is an example representation of filmstrip views and a flipbook view arranged vertically, according to one or more example implementations.

As set forth above, the filmstrip and flipbook may be vertically arranged in alternative implementations. This is represented in FIG. 11, in which a view 1102 contains the child chapter location views A, B, D and E along with the filmstrip view C. The timeline 1112 may be vertical as well.

As can be seen, there is provided a technology for presenting views in a menu that assist a user in recognizing a focused child view (e.g., tile)). Opacity may be used to indicate focused versus non-focused child views. A newly focused child view may be "animated" into focus and/or a no longer focused child view may be "animated" out of focus, e.g., by increasing and decreasing opacity over a number of rendering frames, respectively.

In one aspect, a filmstrip provides spaced images (e.g., by time or by chapters or the like) and a flipbook corresponds to execution of frames within one of the filmstrip chapters. These UI elements are interactive, e.g., via interaction by execution of media transport controls. Filmstrip interaction stops may animate left-to-right when rewinding, and right-to-left when fast-forwarding. This is intended to give the impression that the chapters are being traversed as a visual timeline. Flipbook interaction gives the user visual representation of where he or she is located within streaming video content, as well as fine-grained control for traversing the content using fast forward, rewind, or navigating in some other way (e.g., second-by-second) such as while using a controller or touch-based input.

One or more aspects are directed towards outputting a filmstrip comprising a plurality of chapter views that comprise a visible subset of available chapter views, each chapter view representing a chapter location in a video, and outputting a flipbook view that represents a selected scene within a selected chapter. Described herein is detecting interaction to change the visible subset of chapter views, and changing to a different subset of chapter locations based upon the interaction, including changing the selected chapter to a new chapter and outputting another flipbook view representing a selected scene within the new chapter. Also described is detecting a play command and playing the video based upon the selected scene represented in the flipbook view.

Detecting the interaction to change the chapter views may include detecting interaction with a timeline. Detecting the interaction to change the chapter views may include detecting interaction with one of the chapter views in the visible subset. The selected scene represented in the flipbook view may be changed based upon detecting interaction to move the selected scene.

Further described herein is drawing a parent view over which the plurality of chapter views and the flipbook view are drawn as part of outputting the filmstrip and outputting the flipbook view, and updating a background image of the parent view based upon the selected scene represented in the flipbook view.

One or more aspects are directed towards outputting a menu view, including outputting a child view of the menu view to represent the video, and detecting interaction with the child view to select the video. Focus may be changed to the child view based upon interaction with the child view. One or more style property values associated with drawing another child view may be changed to indicate that the other child view no longer has focus, and/or one or more style property values associated with drawing the child view may be changed to indicate that the child view now has focus. This may include changing an opacity value associated with the child view, which may be done by animating the change over a plurality of rendering frames, e.g., by increasing an opacity value associated with the child view. Similarly, one or more style property values used for drawing the other child may be changed to indicate that the other child view does not have focus, including decreasing an opacity value associated with the other child view, which may be animated over a plurality of rendering frames.

One or more aspects are directed towards a view containing a plurality of child views arranged as a grid, with each child view being able to receive focus corresponding to a focused state via user interaction. Each child view has a set of style property values including subsets of style property values that are selectable for drawing the child view based upon a current state of the child view. One child view is notified to change state to a focused state; the one child view is configured to access its style property values to select a subset thereof to redraw the one child view based upon the focused state of the one child view. Another child view is notified to change state to a non-focused state; the other child view is configured to access its style property values to select a subset thereof to redraw the other child view based upon the non-focused state of the other child view.

The subset of the style property values of the one child view for the focused state may include an increased opacity value, and the subset of the style property values of the other child view for the focused state may include a decreased opacity value. The one child may animate its opacity by redrawing with increasing opacity values over a plurality of rendering frames, and the other child may animate its opacity by redrawing with decreasing opacity values over a plurality of rendering frames.

At least one child view may represent a video, and interaction with the child view selects a video. Another view may correspond to that video, and include a plurality of other child views, including filmstrip child views representing video chapter locations for the video and a flipbook child view representing a scene within a selected movie chapter. The filmstrip child views may be a visible subset of a larger set of filmstrip child views of the other view, and user interaction may change the visible subset to another visible subset of filmstrip child views. User interaction may change the scene represented in the flipbook child view to a new scene; further user interaction may play the video based upon the new scene.

One or more aspects are directed towards displaying on a user interface a part of a filmstrip comprising a set of chapter views representing chapter stops in a video, in which the part comprises a first displayed subset of the chapter views, and displaying a flipbook view that represents a selected scene within a selected chapter. Detecting interaction with the user interface may be to detecting interaction that changes a filmstrip position from the first displayed subset of the chapter views to a different displayed subset of the chapter views, before returning to handle further interaction when detected. The interaction may instead change the selected scene in the flipbook view to a different scene before returning to handle further interaction when detected. The interaction may instead play the video based upon the selected scene of the flipbook view.

Example Computing Device

The techniques described herein can be applied to any device or set of devices (machines) capable of running programs and processes. It can be understood, therefore, that personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below in FIG. 12 is but one example of a computing device.

Implementations can partly be implemented via an operating system, for use by a developer of services for a device or object, and/or included within application software that operates to perform one or more functional aspects of the various implementations described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 12:
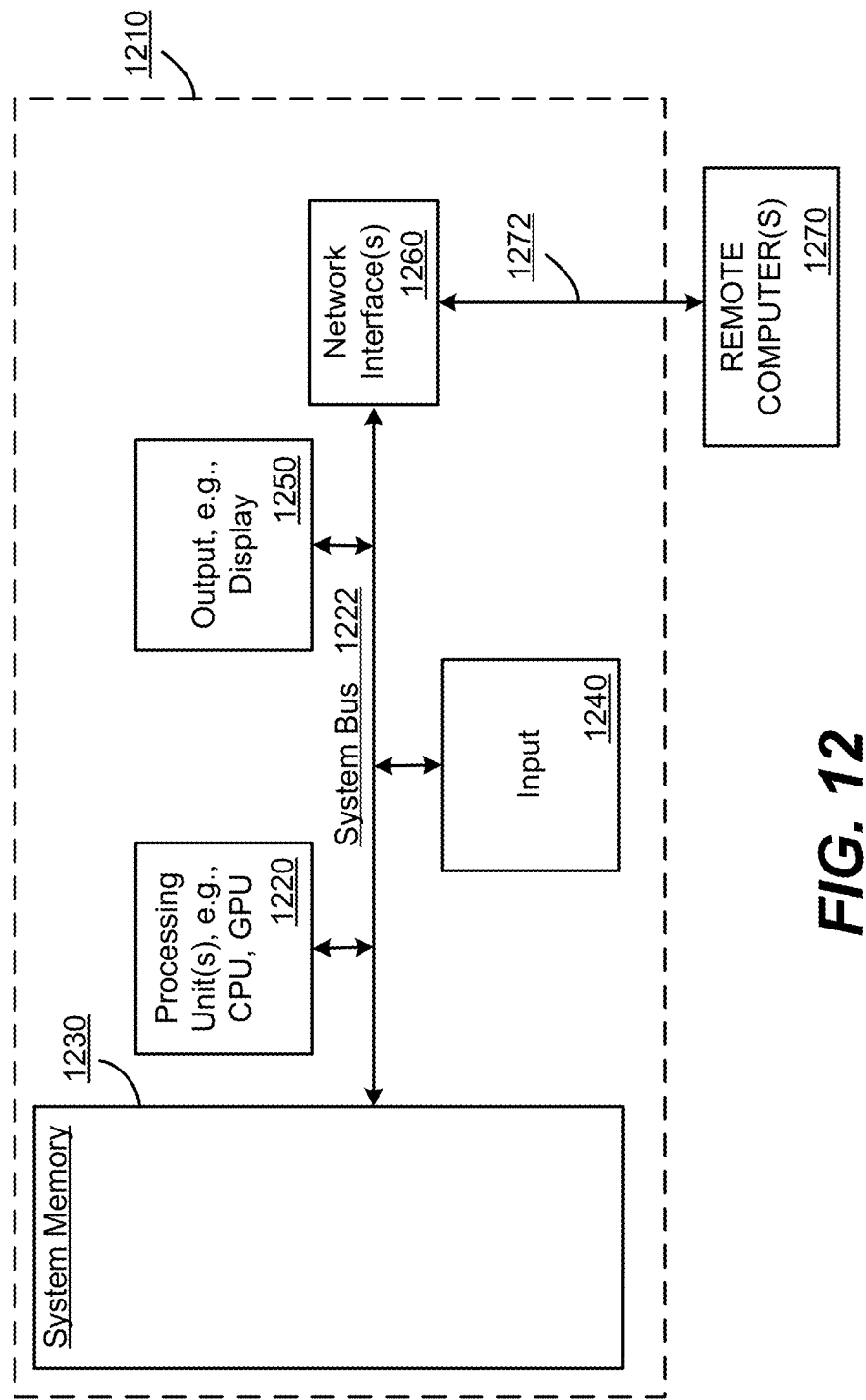
FIG. 12 is a block diagram representing an example computing environment into which aspects of the subject matter described herein may be incorporated.

FIG. 12 thus illustrates an example of a suitable computing system environment 1200 in which one or aspects of the implementations described herein can be implemented, although as made clear above, the computing system environment 1200 is only one example of a suitable computing environment and is not intended to suggest any limitation as to scope of use or functionality. In addition, the computing system environment 1200 is not intended to be interpreted as having any dependency relating to any one or combination of components illustrated in the example computing system environment 1200.

With reference to FIG. 12, an example device for implementing one or more implementations includes a general purpose computing device in the form of a computer 1210. Components of computer 1210 may include, but are not limited to, a processing unit 1220, a system memory 1230, and a system bus 1222 that couples various system components including the system memory to the processing unit 1220.

Computer 1210 typically includes a variety of machine (e.g., computer) readable media and can be any available media that can be accessed by a machine such as the computer 1210. The system memory 1230 may include computer storage media in the form of volatile and/or nonvolatile memory such as read only memory (ROM) and/or random access memory (RAM), and hard drive media, optical storage media, flash media, and so forth; as used herein, machine readable/computer readable storage media stores data that does not include transitory signals, (although other types of machine readable/computer readable media that is not storage media may). By way of example, and not limitation, system memory 1230 may also include an operating system, application programs, other program modules, and program data.

A user can enter commands and information into the computer 1210 through one or more input devices 1240. A monitor or other type of display device is also connected to the system bus 1222 via an interface, such as output interface 1250. In addition to a monitor, computers can also include other peripheral output devices such as speakers and a printer, which may be connected through output interface 1250.

The computer 1210 may operate in a networked or distributed environment using logical connections to one or more other remote computers, such as remote computer 1270. The remote computer 1270 may be a personal computer, a server, a router, a network PC, a peer device or other common network node, or any other remote media consumption or transmission device, and may include any or all of the elements described above relative to the computer 1210. The logical connections depicted in FIG. 12 include a network 1272, such as a local area network (LAN) or a wide area network (WAN), but may also include other networks/buses. Such networking environments are commonplace in homes, offices, enterprise-wide computer networks, intranets and the Internet.

As mentioned above, while example implementations have been described in connection with various computing devices and network architectures, the underlying concepts may be applied to any network system and any computing device or system in which it is desirable to implement such technology.

Also, there are multiple ways to implement the same or similar functionality, e.g., an appropriate API, tool kit, driver code, operating system, control, standalone or downloadable software object, etc., which enables applications and services to take advantage of the techniques provided herein. Thus, implementations herein are contemplated from the standpoint of an API (or other software object), as well as from a software or hardware object that implements one or more implementations as described herein. Thus, various implementations described herein can have aspects that are wholly in hardware, partly in hardware and partly in software, as well as wholly in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts/flow diagrams of the various figures. While for purposes of simplicity of explanation, the methodologies are shown and described as a series of blocks, it is to be understood and appreciated that the various implementations are not limited by the order of the blocks, as some blocks may occur in different orders and/or concurrently with other blocks from what is depicted and described herein. Where non-sequential, or branched, flow is illustrated via flowcharts/flow diagrams, it can be appreciated that various other branches, flow paths, and orders of the blocks, may be implemented which achieve the same or a similar result. Moreover, some illustrated blocks are optional in implementing the methodologies described herein.

Conclusion

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A method comprising:
outputting a filmstrip view, the filmstrip view comprising a plurality of chapter views that comprise a visible subset of available chapter views, each chapter view drawing a representation of itself in the filmstrip view when part of the visible subset of available chapter views and representing a chapter location in a video;
outputting a flipbook view for each chapter view of the visible subset, each flipbook view being a child view of a corresponding chapter view that draws itself in its corresponding chapter view, including drawing a selected chapter view having a flipbook view that represents a selected scene within the selected chapter view;
detecting interaction to change the visible subset of the available chapter views, comprising detecting state change interaction with one of the flipbook views and informing the filmstrip view of the state change interaction, and in response to detecting the interaction, changing to a different visible subset of the available chapter views, including changing the selected chapter view to a new selected chapter view;
detecting a play command; and
playing the video based upon the scene represented in the flipbook view of the new selected chapter view.

2. The method of claim 1 further comprising a timeline, wherein the timeline is a child of the filmstrip view or a child of a parent view of the filmstrip view, and further comprising, detecting other interaction with the timeline and bubbling up the other interaction to the filmstrip view or to the parent view to change the new selected chapter view to another new selected chapter view.

3. The method of claim 1 further comprising, detecting other interaction, and in response to detecting the other interaction, changing the selected scene represented in the new selected flipbook view.

4. The method of claim 1 further comprising, drawing a parent view over which the filmstrip view draws itself, and updating a background image of the parent view based upon the scene represented in the flipbook view of the new selected chapter view.

5. The method of claim 1 further comprising, outputting a menu view, including outputting an interactive child view of the menu view to represent the video, and detecting interaction with the interactive child view to select the video.

6. The method of claim 5 further comprising, changing focus to the interactive child view based upon detecting interaction with the interactive child view.

7. The method of claim 6 wherein drawing the interactive child view comprises using one or more style property values associated with the interactive child view, and further comprising, drawing another interactive child view, comprising using one or more other style property values associated with the other interactive child view to indicate that the other child view no longer has focus.

8. The method of claim 6 further comprising, changing the one or more style property values associated with drawing the interactive child view to indicate that the interactive child view now has focus.

9. The method of claim 8 wherein changing the one or more style property values to indicate that the interactive child view has focus comprises changing an opacity value associated with the interactive child view.

10. The method of claim 9 wherein changing the opacity value comprises animating the change over a plurality of rendering frames.

11. The method of claim 6 further comprising, changing one or more style property values used for drawing the interactive child view to indicate that the interactive child view has focus, including increasing an opacity value associated with the interactive child view, and changing one or more style property values used for drawing another interactive child view to indicate that the other interactive child view does not have focus, including decreasing an opacity value associated with the other interactive child view.

12. The method of claim 6 further comprising, changing one or more style property values used for drawing the interactive child view to indicate that the interactive child view has focus, including increasing an opacity value associated with the interactive child view, in which increasing the opacity value associated with the interactive child view comprises animating the increase over a plurality of rendering frames, and changing one or more style property values used for drawing another interactive child view to indicate that the other interactive child view does not have focus, including decreasing an opacity value associated with the other interactive child view, in which decreasing the opacity value associated with the other interactive child view comprises animating the change over a plurality of rendering frames.

13. A system comprising:
a menu view, the menu view object containing a plurality of child views arranged as a grid, each child view configured to draw itself in the menu view and being interactive to receive focus corresponding to a focused state via user interaction, each child view having a set of style property values including subsets of style property values that are selectable by the child view for drawing the child view based upon a current state of the child view;
one child view notified to change state to a focused state, the one child view configured to access its style property values to select a subset thereof to redraw the one child view based upon the focused state of the one child view; and
another child view notified to change state to a non-focused state, the other child view configured to access its style property values to select a subset thereof to redraw the other child view based upon the non-focused state of the other child view.

14. The system of claim 13 wherein the subset of the style property values of the one child view for the focused state includes an increased opacity value, and wherein the subset of the style property values of the other child view for the focused state includes an decreased opacity value.

15. The system of claim 14 wherein the one child animates its opacity by redrawing with increasing opacity values over a plurality of rendering frames, and wherein the other child animates its opacity by redrawing with decreasing opacity values over a plurality of rendering frames.

16. The system of claim 13 wherein at least one child view represents a video, wherein interaction with a child view selects a video, and further comprising another view corresponding to that video, the other view including a plurality of other child views, including filmstrip child views representing video chapter locations for the video and a flipbook child view representing a scene within a selected movie chapter.

17. The system of claim 16 wherein the filmstrip child views comprise a visible subset of a larger set of filmstrip child views of the other view, and wherein user interaction changes the visible subset to another visible subset of filmstrip child views.

18. The system of claim 16 wherein user interaction changes the scene represented in the flipbook child view to a new scene, and wherein further user interaction plays the video based upon the new scene.

19. One or more non-transitory machine-readable storage media having machine-executable instructions, which when read from the non-transitory storage media and executed by the machine perform steps, comprising:
a) displaying on a user interface a part of a filmstrip view comprising a set of chapter views representing chapter stops in a video, in which the part of the filmstrip view comprises a first displayed subset of the chapter views;
b) displaying a flipbook view that represents a selected scene within a selected chapter view; and
c) detecting interaction with the user interface, including:
i) detecting interaction that changes a filmstrip position from the first displayed subset of the chapter views to a different displayed subset of the chapter views, and returning to c) to handle further interaction when detected; or
ii) detecting interaction to change the selected scene in the flipbook view to a different scene and returning to c) to handle further interaction when detected, or
iii) detecting interaction to play the video based upon the selected scene of the flipbook view.

20. The one or more non-transitory machine-readable storage media of claim 19 wherein each chapter view in the set of chapter views is a child of the filmstrip view and wherein displaying the flipbook view comprises at least one chapter view drawing itself over the filmstrip view.

* * * * *